United States Patent [19]

Jowsey

[11] Patent Number: 4,878,302

[45] Date of Patent: Nov. 7, 1989

[54] IDENTIFICATION TAG

[75] Inventor: Clifford G. Jowsey, Auckand, New Zealand

[73] Assignee: ITW New Zealand Limited, New Zealand

[21] Appl. No.: 110,799

[22] Filed: Oct. 21, 1987

[30] Foreign Application Priority Data

Aug. 13, 1987 [NZ] New Zealand .................. 221443

[51] Int. Cl.⁴ .................................................. G09F 3/00
[52] U.S. Cl. ......................................... 40/302; 40/301
[58] Field of Search ................. 40/301, 302, 304, 306, 40/21 R, 21 C, 312, 2 R

[56] References Cited

U.S. PATENT DOCUMENTS

| | | | |
|---|---|---|---|
| 492,838 | 3/1893 | Rogers | 40/301 |
| 700,483 | 5/1902 | Emeis | 40/302 |
| 2,736,115 | 2/1956 | James | 40/312 |
| 3,388,492 | 6/1968 | Nichols, Jr. | 40/301 |
| 3,605,310 | 9/1971 | Brown | 40/22 |
| 3,826,030 | 7/1974 | Read | 40/301 |
| 4,010,563 | 3/1977 | Schwindt | 40/301 |
| 4,147,168 | 4/1979 | Hayes et al. | 40/301 |

FOREIGN PATENT DOCUMENTS

| | | | |
|---|---|---|---|
| 2830401 | 8/1979 | Fed. Rep. of Germany | 40/301 |
| 509939 | 11/1920 | France | 40/302 |

Primary Examiner—Gene Mancene
Assistant Examiner—J. Hakomaki
Attorney, Agent, or Firm—Burns, Doane, Swecker & Mathis

[57] ABSTRACT

An identification tag to be attached to an animal's ear includes a body and a strap. The body includes a shank adapted to be driven through the animal's ear and through a bore in the strap by means of a tool, and an indicia-bearing section formed integrally with the shank. The shank includes a downwardly extending hole for receiving a driving portion of the tool. The indicia-bearing section projects upwardly from a location spaced laterally of the hole to avoid interfering with entry of the tool into the hole. The shank and strap include interengaging surfaces which prevent relative separation and relative rotation therebetween.

7 Claims, 2 Drawing Sheets

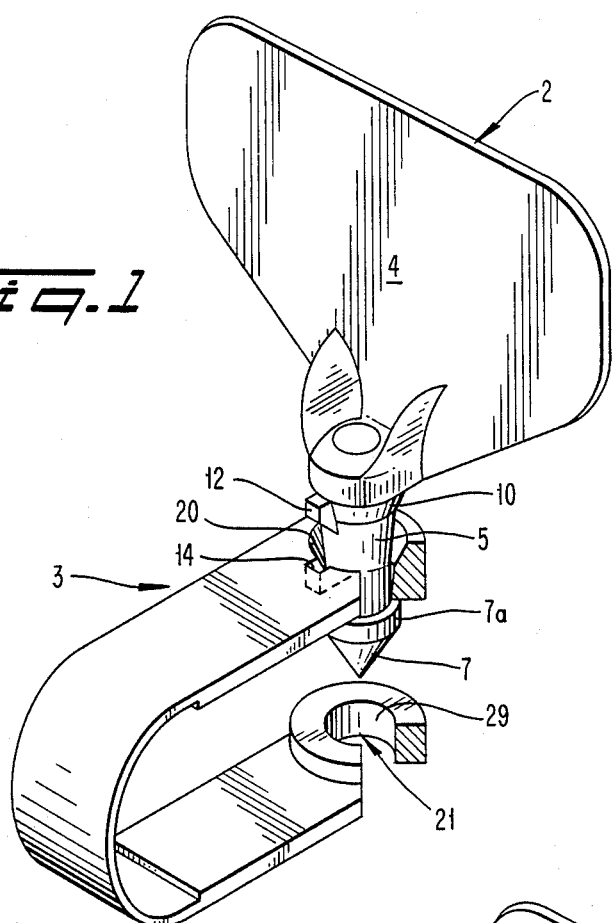
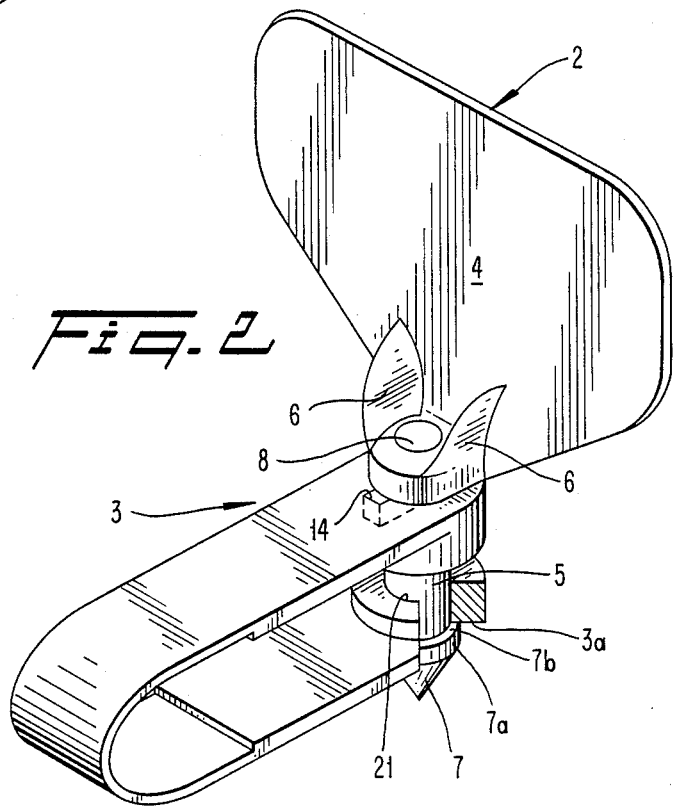

U.S. Patent    Nov. 7, 1989    Sheet 2 of 2    4,878,302
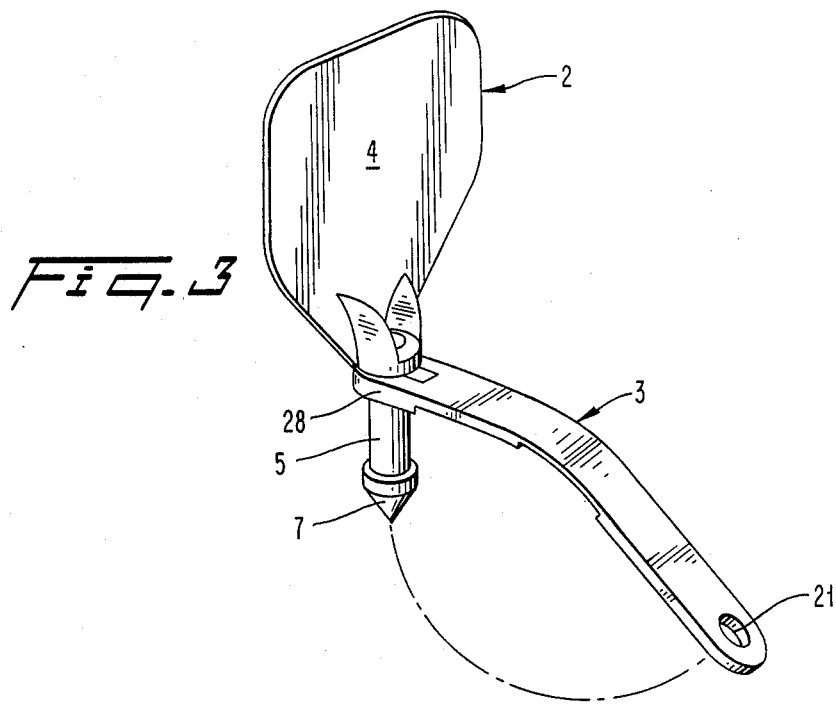
Fig.3
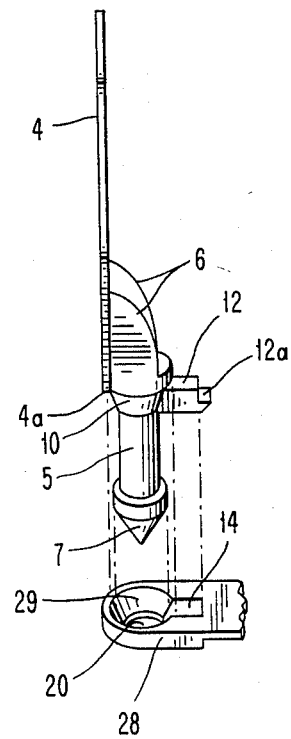
Fig.4-a
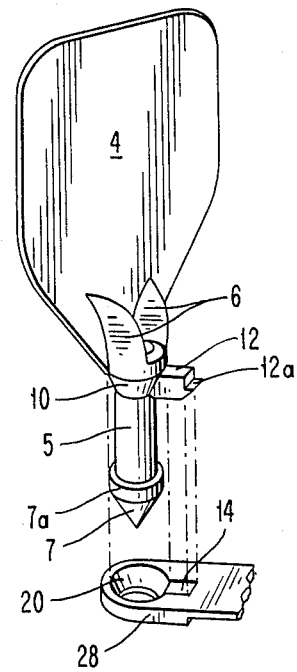
Fig.4-b

IDENTIFICATION TAG

BACKGROUND OF INVENTION

This invention relates to identification means.

In particular, the present invention relates to identification means in the form of tags which are capable of being used to identify animals, such as sheep, cattle, deer and goats and the like, as well as other articles or animals. In the preferred form of the invention, the identification means is described with reference to being in the form of an ear tag, which is capable of being engaged within the ear of an animal for the purpose of identifying the animal. This is however by way of example only.

Up until this time numerous forms of ear tags have been provided, which have attempted to provide for the positive location of an upstanding ear tag, such as an ear tag having a shaft which extends upwardly and locates an upstanding location or indicia section (for example a flat section on which marking and the like can be included). For example, such arrangements are disclosed in U.S. Patent Specification No. 4,010,563 and New Zealand Patent Specification No. 176913. None of the arrangements disclosed and suggested up until this time have however been provided for an adequate positive location of an upstanding indicia section, such as is required with identification means and in particular animal identification means. It will be appreciated that where identification means are being applied to animals such as cattle, sheep, deer and goats and the like, animals will make attempts to remove identification means (such as from ears) such as by rubbing against other animals or articles and the like. It will also be appreciated that such animals are likely to come into contact with other animals, articles such as fences, agricultural equipment and the like, and also the ground, such that they are likely to be knocked, moved within the ear and the like. It is important therefore to provide an arrangement which permits a positive location of an upstanding ear tag for identification means.

SUMMARY OF THE INVENTION

The present invention sets out to provide an arrangement which goes at least some way towards overcoming or at least minimising the above problems.

According to one aspect of this invention there is provided an identification tag including a body portion having an elongate shank; an elongate strap which can engage with said shank; said strap having at least one bore provided in at least one end thereof; said shank being adapted in use to pass through the or each said bore such as to engage with said strap; at least one of said body portion and said strap being formed or provided with means to provide for an inter-engaging relationship between said body portion and said strap which substantially prevents rotational movement therebetween.

According to a further aspect of this invention there is provided identification means including a body portion having an elongate shank; an elongate strap being provided and being adapted to engage with said body portion; a bore passing through said strap adjacent each end thereof; the arrangement being such that in use the strap is located so that the bores are substantially aligned or co-axial; the shank passing through said bores so as to engage the strap relative to the shank; the body portion and at least one bore being formed with means capable of inter-engagement so that the strap and body portion are capable of being maintained in a substantially predetermined or desired position relative to each other.

According to a further aspect of this invention there is provided identification means including a main body portion having an identification section and an elongate shank; elongate strap means being provided and being formed with a bore adjacent each end thereof; the arrangement being such that in use, said identification section is kept in a substantially upright or upstanding manner by engaging with said strap; the strap being folded over so that the bores are substantially aligned or co-axial; the elongate shank extending through said bores and being restrained from movement relative thereto.

According to a further aspect of this invention there is provided identification means including a main body portion having an identification section and an elongate shank; elongate strap means being provided and being formed with a bore adjacent each end thereof; the arrangement being such that in use said identification section is kept in a substantially upright or upstanding and non-rotating manner by engaging with said strap; the strap being folded over so that the bores are substantially aligned or co-axial; the elongate shank extending through said bores, the shank being provided with an enlarged end portion such that on the end portion passing through at least a second end of said strap, the enlarged head portion and second end of the strap are located relative to each other.

According to a further aspect of this invention, there is provided identification means including a main body portion having an identification section and an elongate shank; elongate strap means being provided and being formed with a bore adjacent each end thereof; the arrangement being such that in use said identification section is kept in a substantially upright or upstanding manner by engaging with said strap; the strap being folded over so that the bores are substantially aligned or co-axial; the elongate shank extending through said bores, the shank being provided with an enlarged end portion such that on the end portion passing through one end of said strap, the enlarged head portion and said one end of said strap are held relative to each other, an upper portion of the shank and a portion of the bore at the opposite end of said strap being so formed that there is a positive inter-engagement therebetween.

BRIEF DESCRIPTION OF THE DRAWINGS

This invention will now be described with reference to the accompanying drawings wherein:

FIG. 1 is a partially exploded and sectioned view of one form of the present invention.

FIG. 2 is a further partially sectioned view of one form of the present invention.

FIG. 3 shows a side perspective view of the present invention.

FIGS. 4a and 4b shows side and side perspective views of the present invention.

DETAILED DESCRIPTION OF THE PREFERRED EMBODIMENTS

Referring now to the accompanying drawings, the tag of the present invention includes a main body portion 2 and a strap portion 3. The tag is preferably formed of an appropriate plastics material, or some other flexible or semi-flexible material. Other materials can however be used to an advantage.

The main body portion 2 includes a main indicia section 4 such as shown in the accompanying drawings, this being integrally formed with a downwardly extending shank 5, extending downwardly from the indicia section 4. In one form of the invention, suitable wings 6 extend and curve slightly downwardly from a rear side of the indicia section 4 to each side of the upper portion of the elongate shank 5. The indicia section 4 includes a lower end 4a which cooperates with the shoulder 10 to lock the strap 3 on the shank 5.

In one form of the invention and as will be described hereinafter, the shank 5 is provided with a closed and pointed end 7, and may be substantially hollow in formation with an elongate bore 8, such as to allow for the location of a driving pin or driving member (not shown) such as is associated with an applicator tool for applying a tag to the ear of an animal. In this way the applicator pin does not come into contact or penetrate the animal's tissue thus reducing the risk of cross-infection between animals. Thus, in the preferred form of the invention, the shank 5 is substantially hollow and closed at its bottom end. The shank 5 is preferably substantially circular in cross-section, and is elongate in formation, the connection from the main body portion 4 slanting or tapering down (such as at 10) into the elongate shank 5. The head 7 of the shank 5 is shown pointed and having an upper ridge or flange portion 7a of a greater diameter than the shank 5, so that it extends outwardly around the bottom of the shank 5. The outwardly extending annular flange 7a then extends into the pointed end 7.

Referring further to the accompanying drawings, an upper portion of the elongate shank 5 is provided with a radially outwardly extending tab or engagement member 12, which, serves to engage with a corresponding slot or recess 14 in annular surround of a bore 20 at one end of the strap 3. Referring to the strap 3 shown in the accompanying drawings, it will be appreciated that the strap is of an elongate formation, having a hole or bore at each end thereof. The surface 29 about the bore 20 at the first end of the strap is shown slightly tapered at its upper end.

If desired a plurality of such slots can be provided to engage with one or more tabs 12. The lower portion of the tab 12 is shown provided with a locking key 12A which is engageable within a key way provided between reinforcing flanges 28 on the underside of the strap 3, the key way being the lower extension of the recess 14. The upper end of the strap thus becomes locked between the shoulder 10 and the lower end 4a of the indicia-bearing section on one side of the strap and an upwardly facing shoulder defined by the locking key 12a on the other side of the strap.

The first end of the strap 3 also engages with and under the bottom of the indicia section 4 so that it is engaged firmly relative to the body portion.

If desired, a plurality of outwardly extending engagement members 12, and/or engagement slots or grooves 14 can be provided in both the body portion 2 and the strap 3, to allow for positive engagement between the body portion and the strap. The above however is the preferred form of the invention.

With the tag 2 engaged with the strap 3 there are no 90 degree flanges or inverted steps under which a wire can snag resulting in the tag 2 being pulled off. Also to prevent wire snagging the sides of the tag 2 are shown suitably angled so that there are no steps or flanges above the ear.

It should be appreciated also that other locating means can be provided, in association with one or more of the shank and the strap, to allow for positive location therebetween.

The second end of the strap is also provided with a bore or hole 21 passing therethrough and this can have a tapered lead-in portion formed in the annular surface of the bore 21 as shown in the accompanying drawings.

Referring now to the engagement of the pointed end of the shank 5, with the second end of the strap 3, the pointed end 7 is caused to in use to pass downwardly into the bore 21 at the second end of the shank 3, and such a driving action or friction will cause it to exit from the bore 21.

The upper surface portion 7b of the end of the shank 5 forms an upwardly facing shoulder so dimensioned that the end 7 (and flange 7a) are unable to be withdrawn out of the bore 21.

In use, the first end of the strap is engaged over and about the shank 5 (the shank passing through the bore 20), and the strap is then folded into a substantially flattened "C" shape so that the bores 20 and 21 are spaced apart, but substantially aligned or co-axial. In this position the shaft 5 is caused to be driven or moved downwardly (such as by an applicator tool) and through the hole or bore 21 in the second end of the strap 3 to be firmly engaged within the bore 21 at the second end of the strap 3 (as referred to hereinbefore).

By way of example only, a tag may be applied to the ear of an animal and the first end of the strap is therefore engaged with and about the elongate shank 5. The main body portion 2 and the attached first end of the strap 3 are then engaged within an appropriate applicator tool. For example, an applicator pin emerges within the bore 8 of the hollow shank 5. The remainder of the strap 3 is then bent or curved over into a substantially flattened "C" formation, so that the bore 21 at the second end of the strap 3 is located in a position in which it is spaced apart from, and underneath the pointed end 7 of the shaft 5 and substantially aligned or co-axial with the bore 20 in the first end of the strap 3. For example the second end of the strap can be located on appropriate location means in an applicator tool. The applicator tool (not shown) which can for example include spaced apart jaw members and handles, which are normally spring biased apart, is then placed over the ear of an animal so that the strap is in a substantially flattened "C" configuration, extending about an edge of the ear of an animal, the main body portion and indicia section extending upwardly therefrom. As indicated, the applicator or pin or an applicator tool has already been engaged within the hollow bore 8 in the shank 5 of the body portion 2. The applicator tool is then actuated such as by the handles and jaw members being brought together against the bias of the spring, this causing the pin or locating member engaged within the shank 5 to drive the shank 5 downwardly through the ear of an animal and through the substantially co-axial and aligned bore 21 in the second strap 3. The pointed end 7 of the shank 5 is substantially prevented from being withdrawn by the engagement of the underside of the strap 3 about the bore 21 with the flange 7a.

The design of the bore 21 is such as to facilitate the entry of the end 7 but to ensure locking after entry. Moreover the size of the bore 21 may be such that the size of the plug of skin and cartilage punched out is maximised. This results in earlier healing of the wound and reduces the chance of infection.

By locating, moving or rotating the main body portion and shank relative to the groove 14, the engagement tab or member 12 of the shank 5 can engage within the recess or groove 14 in the annular surface of the bore 20 at the first end of the strap 3, so as to prevent movement of the main body portion 2 and in particular the indicia section 4 to which appropriate identification means can be attached if required. The identification means is thus positively located relative to the ear of the animal and to the supporting and locating strap 3 to maintain its high visibility.

It should be appreciated that improvements and modifications may be made to the invention without departing from the scope or spirit thereof.

I claim:

1. An identification tag adapted to be attached to an animal's ear by means of a manually operated tool, said tag comprising:
a body portion comprising:
an elongate, downwardly extending shank including a downwardly pointed lower end and a radially projecting upwardly facing first shoulder disposed above said pointed lower end, said shank including a radially projecting tab disposed above said first shoulder and separated therefrom by an outer periphery of said shank, a locking key projecting radially from said shank and forming an upwardly facing second shoulder, said shank including a radially projecting downwardly facing third shoulder disposed above said second shoulder and spaced therefrom, said shank having a hole extending downwardly into an upper end thereof for receiving a driving portion of the tool to enable the tool to drive said pointed lower end of said shank through an animal's ear, and
an indicia-bearing section integrally formed with said shank and extending upwardly from a location adjacent said third shoulder and spaced radially of said hole for enabling said hole to receive the driving portion of the tool, and
an elongate strap including first and second bores disposed adjacent opposite ends thereof, said strap being bent intermediate said opposite ends whereby said first bore constitutes an upper bore and said second bore constitutes a lower bore aligned with said upper bore, said lower bore sized to receive said pointed lower end of said shank such that a first one of said ends of said strap comes to rest against said first shoulder, said upper bore being sized to receive an upper portion of said shank and said strap including a radially extending slot opening into said upper bore for receiving said tab such that a second one of said ends of said strap is locked between said second and third shoulders and is held against rotation relative to said shank by said tab.

2. The identification tag of claim 1, wherein said outer periphery of said shank is cylindrical, said pointed end of the shank is conical and said bores of the strap are circular in cross-section.

3. The identification tag of claim 1, wherein said locking key projects radially from a lower portion of said tab.

4. The identification tag of claim 1, wherein said indicia-bearing section includes a lower end which is adjacent to and cooperates with said downwardly facing shoulder of said shank to lock said strap between said second upwardly facing shoulder and said downwardly facing shoulder of said shank and said lower end of said indicia-bearing section.

5. An identification tag adapted to be attached to an animal's ear by means of a manually operated tool, said tag comprising:
a body portion comprising:
an elongate, downwardly extending shank including a downwardly pointed lower end and a radially projecting upwardly facing shoulder disposed above said pointed lower end, said shank including a radially projecting tab disposed above said upwardly facing shoulder and separated therefrom by an outer periphery of said shank, said shank including a radially projecting downwardly facing shoulder disposed above said upwardly facing lateral shoulder and spaced therefrom, said shank having a hole extending downwardly into an upper end thereof for receiving a driving portion of the tool to enable the tool to drive said pointed lower end of said shank through an animal's ear, and
an indicia-bearing section integrally formed with said shank and extending upwardly from a location adjacent said downwardly facing shoulder and spaced radially of said hole for enabling said hole to receive the driving portion of the tool, and
an elongate strap including first and second bores disposed adjacent opposite first and second ends thereof, said strap being bent intermediate said opposite ends whereby said first bore constitutes an upper bore and said second bore constitutes a lower bore aligned with said upper bore, said lower bore sized to receive said pointed lower end of said shank such that said first end of said strap comes to rest against said upwardly facing shoulder, said upper bore being sized to receive an upper portion of said shank and said strap including a radially extending slot opening into said upper bore for receiving said tab such that said second end of said strap is held against rotation relative to said shank by said tab when the identification tag is attached to an animal's ear.

6. The identification tag of claim 5, wherein said outer periphery of said shank is cylindrical, said pointed end of the shank is conical and said bores of the strap are circular in cross-section.

7. The identification tag of claim 5, wherein said indicia-bearing section includes a lower end which is adjacent to and cooperates with said downwardly facing shoulder of said shank to lock said strap between said upwardly facing shoulder and said downwardly facing shoulder of said shank and said lower end of said indicia-bearing section.

* * * * *